US006818130B1

(12) United States Patent
Varriale et al.

(10) Patent No.: US 6,818,130 B1
(45) Date of Patent: Nov. 16, 2004

(54) METHOD AND APPARATUS FOR MULTISTAGE LIQUID FILTRATION

(75) Inventors: Monica G. Varriale, Woodstock, GA (US); Robert J. Lyng, Alpharetta, GA (US); Michael S. Brunner, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 198 days.

(21) Appl. No.: 09/675,464

(22) Filed: Sep. 28, 2000

Related U.S. Application Data

(60) Provisional application No. 60/156,892, filed on Sep. 30, 1999.

(51) Int. Cl.[7] .............................. C02F 1/28; C02F 9/02; C02F 9/08; B01D 29/56; B01D 29/58
(52) U.S. Cl. ...................... 210/266; 210/243; 210/492; 210/335; 210/323.2; 210/501; 210/509
(58) Field of Search .................................. 210/266, 259

(56) References Cited

U.S. PATENT DOCUMENTS

| | | | |
|---|---|---|---|
| 3,327,856 A | 6/1967 | Beduhn | 210/136 |
| 3,327,859 A | 6/1967 | Pall | 210/266 |
| 3,372,808 A | * 3/1968 | Sabo | |
| 3,705,651 A | * 12/1972 | Klein | |
| 4,523,995 A | 6/1985 | Pall et al. | 210/504 |
| 4,595,500 A | * 6/1986 | Galbiati | |
| 4,681,677 A | * 7/1987 | Kuh et al. | |
| 4,711,723 A | * 12/1987 | Bray | |
| 5,004,535 A | * 4/1991 | Bosko et al. | |
| 5,635,063 A | 6/1997 | Rajan et al. | 210/266 |
| 5,688,588 A | 11/1997 | Cotton et al. | |
| 6,274,041 B1 | * 8/2001 | Williamson et al. | |

FOREIGN PATENT DOCUMENTS

| | | |
|---|---|---|
| CN | 2240520 Y | 11/1996 |
| EP | 0477954 A1 | 4/1992 |
| EP | 0681993 A1 | 11/1995 |
| WO | WO 93/18837 | 9/1993 |
| WO | WO 96/31440 | 10/1996 |
| WO | 98/04335 | * 2/1998 |
| WO | WO 01/07090 A1 | 7/2000 |

OTHER PUBLICATIONS

U.S. patent application No. US 2002/013746 A1, published Oct. 3, 2002, entitled Composite Filter Medium and Fluid Filters Containing Same; Inventor: Evan E. Koslow.
Publication: "Kinetics of Capture of Colloidal Particles in Packed Beds under Attractive Double Layer Interactions;" by Menachem Elimelech at School of Engineering and Applied Science, University of California; in Journal of Colloid and Interface Science, vol. 146, No. 2, Oct. 15, 1991.

* cited by examiner

*Primary Examiner*—Thomas M. Lithgow
(74) *Attorney, Agent, or Firm*—Dority & Manning

(57) ABSTRACT

The present invention provides a multistage liquid filtering apparatus and a multistage process for filtering microorganisms and other unwanted impurities from the liquid. The invention employs a microorganism-removing filter stage prior to an activated carbon filter stage and especially adaptable for use with home water supplies.

4 Claims, 2 Drawing Sheets

METHOD AND APPARATUS FOR MULTISTAGE LIQUID FILTRATION

The present invention is based on provisional patent application Ser. No. 60/156,892 filed Sep. 30, 1999, and priority is hereby claimed therefrom.

FIELD OF THE INVENTION

The present invention relates to an apparatus and process for the removal of undesired particulates and microorganisms from water and other liquids. More particularly, the present invention relates to an apparatus and process for the more efficient filtration of liquids such as water.

BACKGROUND OF THE INVENTION

Water intended for human consumption is expected to be either free of harmful constituents or contain concentrations of such constituents that are below harmful levels. To provide potable water for use in homes and businesses, municipalities utilize industrial scale processes in an effort to eliminate or reduce harmful constituents present in water drawn from large, naturally occurring water sources. Potable water is also frequently obtained on a smaller scale from wells and springs and usually without any treatment prior to consumption.

Unfortunately, the potability of a particular water supply is sometimes questionable. The consistency and efficiency of treatment by municipalities may vary due to numerous factors such as heavy rainfall, equipment failures, and usage levels. Depending upon the seriousness of a variation in treatment, a municipality may be forced to notify its consumers that further treatment of the water supplied, e.g. boiling, is required at the point of use before consumption is safe. Water obtained directly from a natural source may also become suspect depending upon environmental conditions near the source. For examples, wells and springs can be contaminated due to rain water run-off washing a contaminant into the source. Accordingly, a need exists for liquid filtration devices suitable in size and scale for residential or office use.

In response, liquid filtration devices have been developed. Such devices range from those located at the point-of-use (e.g. the spigot of a kitchen sink, gravity-flow dispensers such as water pitchers, and low-pressure dispensers such as sports bottles) to the generally bulkier point-of-entry units hidden from view within the plumbing of a home or office. Many of these devices use activated charcoal in at least one stage of the filtration process. Activated charcoal helps to remove strong odors and tastes from water. More specifically, activated charcoal can remove chlorine, and sediment from water.

A problem associated with the use of activated charcoal (also referred to as activated carbon) is that certain microorganisms, like bacteria, propagate rapidly within activated charcoal. This problem has at least three undesirable effects. First, the growth of bacteria within the charcoal may inhibit the flow of water through this stage of the filter. Second, and more importantly, the use of activated charcoal can actually increase the concentration of bacteria present in the water by providing a moist, nutrient-rich environment that is conducive to bacterial reproduction as described in Daschner et al., *Microbiological Contamination of Drinking Water in a Commercial Household Water Filter System*, 15 Eur. J. Clin. Microbiol. Infect. Dis. 233—37 (1996). Third, for those uses that are intermittent, the first flow of water through the activated charcoal after a period of nonuse will contain a spike concentration of bacteria.

Typically, a certain concentration of bacteria is present in all water supplies. This concentration can increase in activated charcoal that is not flushed by the periodic use of water from a particular filter. The result is a spike concentration present in each intermittent use as the bacteria is flushed form the activated charcoal. Increased bacteria concentration is the opposite result intended by the filter installation. While many filtrations mechanisms are available, none address all of these challenging problems without frequent replacement of the activated charcoal.

U.S. Pat. No. 5,271,837 describes a multistage system for the filtration of drinking water utilizing a central filter cartridge constructed of activated charcoal impregnated with silver, a cation exchange resin, and an anion exchange resin. The activated charcoal is the first stage of the filtration system, followed by the resins. To prevent particulates from clogging the central filter cartridge, U.S. Pat. No. 5,271,837 discloses a particulate filter located prior to the central filter cartridge. This patent, however, does not address any problems unique to the filtration of microorganisms or the prevention of bacteria growth on the activated charcoal.

U.S. Pat. No. 5,891,333 describes a modular, multistage water filter for use in countertop or below-countertop applications. This patent is directed to a device with removable, replaceable cartridges containing filter media within a configuration that permits changes in size scale depending upon the filtration capacity desired. The disclosure does not specify any particular filter media or constituent filtration sequence. The removal of any particular constituent from a water supply is not taught.

U.S. Pat. No. 5,318,703 describes a water filter module for use in coffee brewing that is designed to remove residual chlorine, odors, foul tastes, impurities, and unspecified other sediments from water prior to contact with the coffee grinds. The filter media disclosed is activated carbon which is held in place by mesh screens. The mesh screens, which may be a polymer material, are included to remove large particulate impurities, such as sediment and other dirt particles, by mechanical filtration. The removal of microorganisms or any specific problems associated therewith is not addressed.

A disposable filter constructed of a paper filter media is presented in U.S. Pat. No. 5,554,288. Finely-divided adsorbents are uniformly distributed throughout a pulp from which a paper filter media is created for use in variety of configurations. Various adsorbents are claimed, including activated carbon. U.S. Pat. No. 5,554,288 specifically recognizes that carbon filter cartridges that remain immersed in the water being treated may become a hospitable medium for bacteria growth. However, as claimed, this particular problem is avoided because the filters of U.S. Pat. No. 5,554,288 are discarded after use rather than remaining immersed in the water. This solution, however, requires the user to frequently replace the filter, and requires disposal of the spent filter.

Therefore, a need has existed for an improved method and apparatus for the removal of undesired particulates and microorganisms, such as bacteria, viruses, protozoans, yeast, fungi, and microbiological cysts, from liquids such as water. More particularly, a need for an improved method and apparatus for the filtration of liquids with greater filtration efficiency and the elimination of spike concentrations of microorganisms has existed that is not addressed by the prior art.

SUMMARY OF THE INVENTION

The present invention addresses some of the problems identified above by providing a method and apparatus for filtering fluids such as water that reduces bacteria contact with the activated charcoal stage of the filter. More specifically, a filter stage is placed in the water stream of a multistage filter at a point in flow prior to the activated carbon such that the microorganisms are substantially removed from the water prior to the filtration by the activated carbon.

By consequently preventing bacteria contact with the activated charcoal, the problems of increased bacteria concentration and associated flow reduction are avoided. For uses that are intermittent, the problem of spike concentrations is avoided by preventing the in microorganisms from reaching the activated carbon where conditions for reproduction may be conducive during periods of no water flow.

Multiple embodiments of the invention may be employed. For example, the filter may consist of stages in the form of beds of material in a stacked configuration within a cylindrically- or otherwise-shaped chamber. The liquid may enter the chamber from one end, pass longitudinally through the various stages of filter media, and then exit the chamber to a point of use. Other configurations of the filter system are also within the scope of the present invention and modifications to the structural configurations should not affect the ability of the presently-inventive apparatus and process to effectively filter fluids such as water. It should be understood that while a water filtering process is exemplified herein, the present process and apparatus may be utilized for filtering other liquids depending on the contaminant removal characteristics desired.

The beds of material utilized in the present invention may include beads, resins, granular materials, or compressed adsorbents and may be charged or uncharged. Alternatively, in another embodiment, the filter may consist of stages in the form of sheets or webs of filtration media layered together through which the water is caused to flow. Each sheet may be constructed of a filtration media specifically designed for the removal of certain constituents. In still another embodiment, the filter may consist of stages in the form of concentric, cylindrical layers where water is caused to flow either radially inward or outward through the layers and then on to the point of use.

The scope of the present invention is not limited to any particular embodiment set forth herein. Instead, the present invention requires that, regardless of a particular embodiment, configuration, or shape of the device in which the filter is housed or used, the liquid is filtered prior to flow through the activated carbon using a filter media that removes microorganisms. As used herein with respect to action relative to microorganisms, "removal of microorganisms" includes the killing, capturing, or deactivation of such microorganisms.

In addition, without limiting the scope of the present invention, additional stages of filter media may be added to the filter, depending upon the constituents sought to be removed. These stages may be located before or after the stage which includes activated charcoal. Again, the present invention requires that at least one stage for the removal of microorganisms precedes the stage containing activated charcoal.

The entire filter apparatus, having at least two stages, may be assembled into a variety of physical shapes and configurations depending upon the intended consumer or application. For example, and without limiting the scope of the present invention, a device containing the filter media may be readily attached to the spigot of a kitchen sink or other tap supplying water. In still another configuration, a device containing the filter unit that fits into a cabinet or within the plumbing of a residence or business may be utilized. Other embodiments include the use of the apparatus in a pitcher, sports bottle, or other dispenser.

In one particular embodiment of the present invention, water entering the filter apparatus first passes through a stage constructed of a meltblown web, a charge-modified meltblown, a glass fiber web, or a charge-modified glass fiber web. This stage acts to remove turbidity-related components which may act to cloud the liquid and various sediments, as well as certain organic components. The water then passes through another stage constructed of a one or more microporous materials such as microfiber glass. Microorganisms, including bacteria, are primarily removed by this stage.

Subsequent to these two stages, the water passes through a stage of activated carbon where other impurities are removed through adsorption. As the bacteria has already been removed prior to this stage, the activated carbon becomes less fouled with microorganisms such as bacteria.

These and other features, aspects and advantages of the present invention will become better understood with reference to the following description and appended claims. The accompanying drawings, which are incorporated in and constitute a part of this specification, illustrate an embodiment of the invention and, together with the description, serve to explain the principles of the invention.

BRIEF DESCRIPTION OF THE DRAWING

A full and enabling disclosure of the present invention, including the best mode thereof, to one of ordinary skill in the art, is set forth more particularly in the remainder of the specification, including reference to the accompanying drawings, in which.

DETAILED DESCRIPTION OF THE PREFERRED EMBODIMENTS

Figure 1:
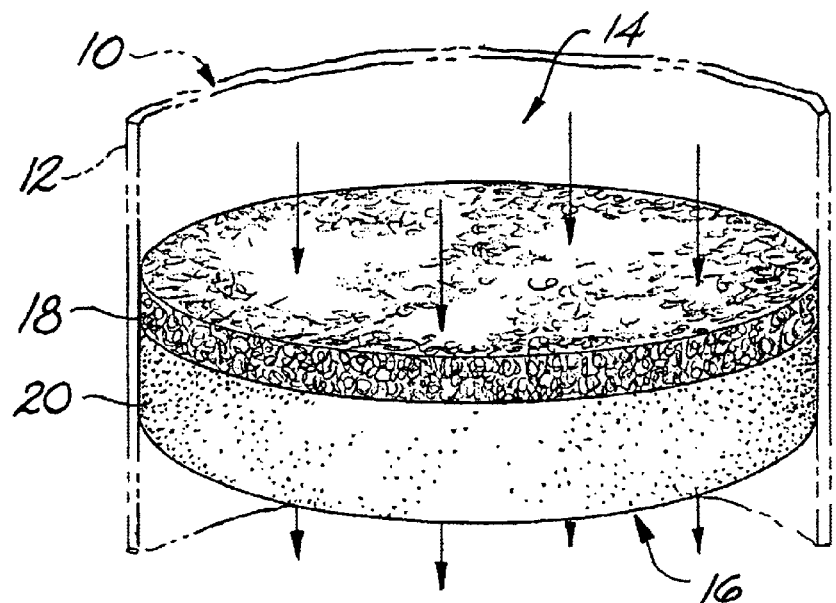
FIG. 1 is a diagrammatic representation of an embodiment of the present invention showing water flow through the filter media.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

In general, the present invention relates to a method and apparatus for filtering a liquid that reduces bacteria contact with the activated charcoal stage of a fluid filter. More specifically, a filter stage may be placed in the water stream of a multistage filter at a point in flow prior to the activated carbon stage such that microorganisms are substantially removed from the water prior to the filtration by the activated carbon.

The invention includes a first embodiment having a multistage water filter 10 includes a chamber 12 having an inlet 14 for water flow; an outlet 16 for water flow; a first filter stage 18 within chamber 12 and in fluid communication with inlet 14; and a second filter stage 20 within chamber 12 and in fluid communication with outlet 16. The second filter stage 20 is located within the chamber 12 at a position that allows water to pass through the first filter stage 18 prior to passing through the second filter stage 20.

It is to be understood that various other arrangements of the filter stages could be utilized. For example, the stages may not be present within the same chamber but may be in fluid communication through tubing or the like.

The first filter stage 18 is constructed of a filter media that removes, captures, kills, or deactivates microorganisms. Examples of materials that may be used for first filter stage 18 are microporous materials such as a nonwoven meltblown web, a nonwoven microfiber glass web or various charge-modified media such as a nonwoven charge-modified meltblown web or a nonwoven charge-modified microfiber glass web. Other filter media that may be utilized for this first filter stage include media that kill or deactivate the microorganisms.

Generally, if microporous materials are employed, such materials may have pore sizes that are 20 microns or less in size, and in some embodiments, pore sizes that are 10 microns or less in size. In other embodiments, the microporous materials will have a maximum pore size of 7.5 microns. These includes various microfiber glass configurations as well as various nonwoven webs.

As used herein, the term "nonwoven web" means a web or fabric having a structure of individual fibers or threads which are interlaid, but not in an identifiable manner as in a knitted or woven fabric. Nonwoven webs generally may be prepared by methods which are well known to those having ordinary skill in the art. Examples of such processes include, by way of illustration only, meltblowing, coforming, spunbonding, carding and bonding, air laying, and wet laying. Meltblowing, coforming, and spunbonding processes are exemplified by the following references, each of which is incorporated herein by reference:

(a) meltblowing references include, by way of example, U.S. Pat. No. 3,016,599 to R. W. Perry, Jr., U.S. Pat. No. 3,704,198 to J. S. Prentice, U.S. Pat. No. 3,755,527 to J. P. Keller et al., U.S. Pat. No. 3,849,241 to R. R. Butin et al., U.S. Pat. No. 3,978,185 to R. R. Bufin et al., and U.S. Pat. No. 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references include U.S. Pat. No. 4,100,324 to R. A. Anderson et al. and U.S. Pat. No. 4,118,531 to E. R. Hauser; and (c) spunbonding references include, among others, U.S. Pat. No. 3,341,394 to Kinney, U.S. Pat. No. 3,655,862 to Dorschner et al., U.S. Pat. No. 3,692,618 to Dorschner et al., U.S. Pat. No. 3,705,068 to Dobo et al., U.S. Pat. No. 3,802,817 to Matsuki et al., U.S. Pat. No. 3,853,651 to Porte, U.S. Pat. No. 4,064,605 to Akiyama et al., U.S. Pat. No. 4,091,140 to Harmon, U.S. Pat. No. 4,100,319 to Schwartz, U.S. Pat. No. 4,340,563 to Appel and Morman, U.S. Pat. No. 4,405,297 to Appel and Morman, U.S. Pat. No. 4,434,204 to Hartman et al., U.S. Pat. No. 4,627,811 to Greiser and Wagner, and U.S. Pat. No. 4,644,045 to Fowells.

A nonwoven charge-modified microfiber glass web may be prepared from a fibrous web which incorporates glass fibers having a cationically charged coating thereon. Generally, such microfibers would be glass fibers having a diameter of about 10 microns or less. The coating includes a functionalized cationic polymer which has been crosslinked by heat; in other words, the functionalized cationic polymer has been crosslinked by heat after being coated onto the glass fibers. Such fibrous filter is prepared by a method which involves providing a fibrous filter which includes glass fibers, passing a solution of a functionalized cationic polymer crosslinkable by heat through the fibrous filter under conditions sufficient to substantially coat the fibers with the functionalized cationic polymer, and treating the resulting coated fibrous filter with heat at a temperature and for a time sufficient to crosslink the functionalized cationic polymer present on the glass fibers. The functionalized cationic polymer may be an epichlorohydrin-functionalized polyamine or an epichlorohydrin-functionalized polyamido-amine.

In general, when used as a filter media, a charge-modified microfiber glass web will contain at least about 50 percent by weight of glass fibers, based on the weight of all fibers present in the filter media. In some embodiments, essentially 100 percent of the fibers will be glass fibers. When other fibers are present, however, they generally will be cellulosic fibers, fibers prepared from synthetic thermoplastic polymers, or mixtures thereof.

As used herein, the terms "cationically charged" in reference to a coating on a glass fiber and "cationic" in reference to the functionalized polymer mean the presence in the respective coating and polymer of a plurality of positively charged groups. Thus, the terms "cationically charged" and "positively charged" are synonymous. Such positively charged groups typically will include a plurality of quaternary ammonium groups, but they are not necessarily limited thereto.

The term "functionalized" is used herein to mean the presence in the cationic polymer of a plurality of functional groups, other than the cationic groups, which are capable of crosslinking when subjected to heat. Thus, the functional groups are thermally crosslinkable groups. Examples of such functional groups include epoxy, ethylenimino, and episulfido. These functional groups readily react with other groups typically present in the cationic polymer. The other groups typically have at least one reactive hydrogen atom and are exemplified by amino, hydroxy, and thiol groups. It may be noted that the reaction of a functional group with another group often generates still other groups which are capable of reacting with functional groups. For example, the reaction of an epoxy group with an amino group results in the formation of a $\beta$-hydroxyamino group.

Thus, the term "functionalized cationic polymer" is meant to include any polymer which contains a plurality of positively charged groups and a plurality of other functional groups which are capable of being crosslinked by the application of heat. Particularly useful examples of such polymers are epichlorohydrin-functionalized polyamines and epichlorohydrin-functionalized polyamido-amines. Both types of polymers are exemplified by the Kymene® resins which are available from Hercules Inc., Wilmington, Delaware. Other suitable materials include cationically modified starches, such as such as RediBond, from National Starch.

As used herein, the term "thermally crosslinked" means the coating of the functionalized cationic polymer has been heated at a temperature and for a time sufficient to crosslink the above-noted functional groups. Heating temperatures typically may vary from about 50° C. to about 150° C. Heating times in general are a function of temperature and the type of functional groups present in the cationic polymer. For example, heating times may vary from less than a minute to about 60 minutes or more.

A nonwoven charge-modified meltblown web may consist of hydrophobic polymer fibers, amphiphilic macromolecules adsorbed onto at least a portion of the surfaces of the hydrophobic polymer fibers, and a crosslinkable, functionalized cationic polymer associated with at least a portion of the amphiphilic macromolecules, in which the functionalized cationic polymer has been crosslinked. Crosslinking may be achieved through the use of a chemical crosslinking agent or by the application of heat. Desirably, thermal crosslinking, i.e., the application of heat, will be employed. In general, the amphiphilic macromolecules may be of one or more of the following types: proteins, poly(vinyl alcohol), monosaccharides, disaccharides, polysaccharides, polyhydroxy compounds, polyamines, polylactones, and the like. Desirably, the amphiphilic macromolecules will be amphiphilic protein macromolecules, such as globular protein or random coil protein macromolecules. For example, the amphiphilic protein macromolecules may be milk protein macromolecules. The functionalized cationic polymer typically may be any polymer which contains a plurality of positively charged groups and a plurality of other functional groups which are capable of being crosslinked by, for example, chemical crosslinking agents or the application of heat. Particularly useful examples of such polymers are epichlorohydrin-functionalized polyamines and epichlorohydrin-functionalized polyamido-amines. Other suitable materials include cationically modified starches.

The nonwoven charge-modified meltblown web may be prepared by a method which involves providing a fibrous meltblown filter media which includes hydrophobic polymer fibers, passing a solution containing amphiphilic macromolecules through the fibrous filter under shear stress conditions so that at least a portion of the amphiphilic macromolecules are adsorbed onto at least some of the hydrophobic polymer fibers to give an amphiphilic macromolecule-coated fibrous web, passing a solution of a crosslinkable, functionalized cationic polymer through the amphiphilic macromolecule-coated fibrous web under conditions sufficient to incorporate the functionalized cationic polymer onto at least a portion of the amphiphilic macromolecules to give a functionalized cationic polymer-coated fibrous web in which the functionalized cationic polymer is associated with at least a portion of the amphiphilic macromolecules, and treating the resulting coated fibrous filter with a chemical crosslinking agent or heat. Desirably, the coated fibrous filter will be treated with heat at a temperature and for a time sufficient to crosslink the functionalized cationic polymer.

The second filter stage 20 includes activated carbon. This may be present in granular form, or compressed into a volume having any of a myriad of shapes, including cylinders, sheets, and discs. Solid porous filter shapes are especially desirable for ease of handling and ready disposability. These may be manufactured by extruding a mixture of a thermoplastic binder material and a powdered or granular form of activated carbon. Various other components may be present in this activated carbon-containing stage, such as zeolites, ion-exchange resins, binder agents, and various other adsorbents.

As used herein, the term "thermoplastic binder" means any binder, typically a polymer, which is thermoplastic, i.e., capable of softening and flowing when heated and of hardening again when cooled. Examples of thermoplastic binders include, by way of illustration only, end-capped polyacetals, such as poly(oxymethylene) or polyformaldehyde, poly(trichloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and poly(vinyl fluoride); polyamides, such as poly(6-aminocaproic acid) or poly(e-caprolactam), poly(hexamethylene adipamide), poly(hexamethylene sebacamide), and poly(11-aminoundecanoic acid); polyaramides, such as poly(imino-1,3-phenyleneiminoisophthaloyl) or poly(m-phenylene isophthalamide); parylenes, such as poly-p-xylylene, and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenyleneisopropylidene-1,4-phenylene), and poly(sulfonyl-1,4-phenylene-oxy-1,4-phenylenesulfonyl-4,4'-biphenylene); polycarbonates, such as poly(bisphenol A) or poly(carbonyldioxy-1,4-phenyleneisopropylidene-1,4-phenylene); polyesters, such as poly(ethylene terephthalate), poly(tetramethylene terephthalate), and poly(cyclohexyl-ene-1,4-dimethylene terephthalate) or poly(oxymethylene-1,4-cyclohexylenemethyleneoxyterephthaloyl); polyaryl sulfides, such as poly(p-phenylene sulfide) or poly(thio-1,4-phenylene); polyimides, such as poly(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystyrenes; and copolymers of the foregoing, such as acrylonitrilebutadiene-styrene (ABS) copolymers.

The chamber 12 can be formed into any shape that accepts the filter structure and allows water to flow through the stages in the disclosed order. By way of example, the chamber 12 may be shaped for various point-of-use applications such as connection to a faucet or insertion into the top of a pitcher. In such applications, the chamber (and thus the filter stages) are usually cylindrical. However, the present invention does not require only cylindrically-shaped chambers and filters.

Embodiments 2, 3 and 4 discloses different embodiments of the invention than the first embodiment. These embodiments serve only as examples as multiple other embodiments may be readily envisioned by one skilled in the art based on the teachings set forth herein. For example, various charge-modified media may be used as the filter stages prior to the stage that includes the activated carbon as well as after the activated carbon layer stage. For further example, a multistage filter may have a layer of charge-modified media as the first filter stage, then an activated charcoal-containing layer as the second filter stage, followed by another layer of charge-modified media as a third filter stage which acts as a polishing stage to remove various unwanted contaminants after flow through the activated carbon-containing stage. In addition, multiple similar layers of the filter stages may be employed, such as a layer of charge-modified media, followed by an activated carbon-containing layer, followed by two layers of charge-modified media, followed by another layer containing activated carbon, and then finally followed by a final layer of charge-modified media.

Figure 2:
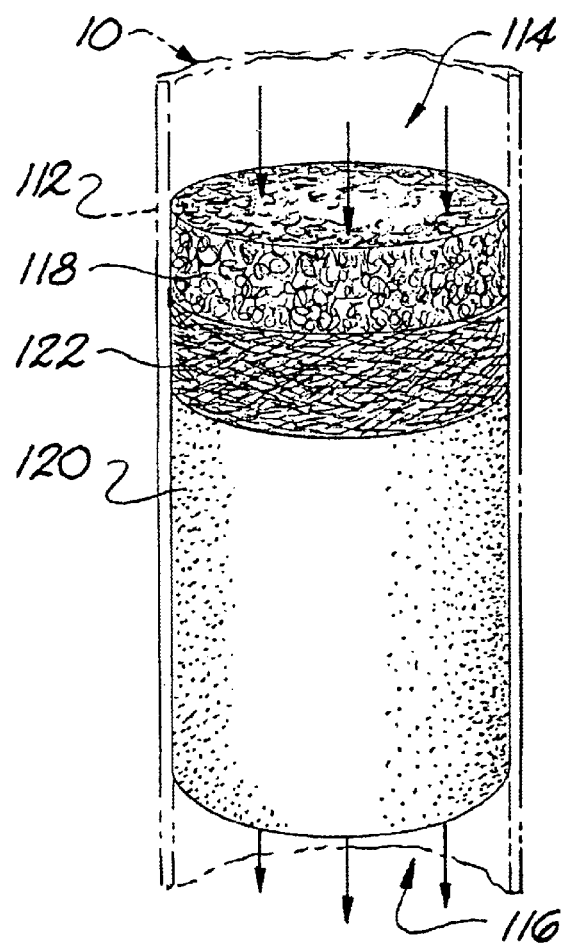
FIG. 2 is a diagrammatic representation of another embodiment of the present invention showing water flow through the filter media.

FIG. 2 represents a multistage water filter 110 having a chamber 112 having an inlet 114 for water flow; an outlet 116 for water flow; a first filter stage 118 within chamber 112 and in fluid communication with inlet 114; a second filter stage 120 within chamber 112 and in fluid communication with outlet 116; and a third filter stage 122 including a microporous material. The second filter stage 120 is located within the chamber 112 at a position that allows water to pass through the first filter stage 118 prior to passing through the second filter stage 120.

The third filter stage 122 is located within chamber 112 in a position that allows water to pass through third filter stage 122 prior to passing through the second filter stage 120. Therefore, the third filter stage 122 may be located in a position that allows water to pass through third filter stage 122 after passing through the first filter stage 118 as disclosed in the second embodiment, or the third filter stage 122 may be located in a position that allows water to pass through third filter stage 122 first, through first filter stage 118 second, and then through second filter stage 120. The second filter stage 120 includes activated carbon as disclosed in the first embodiment. The first filter stage 118 and third filter stage 122 may be constructed of microporous materials as disclosed in the first embodiment. In some embodiments, this third filter stage 122 may include a porous material that exhibits a gradient pore structure, meaning that the diameter of the pores vary from one surface of the filter stage to the other surface of the filter stage. For example, when the third filter stage is intended to act as a sediment-removal stage, the diameter of the pores may decrease from the initial fluid-contact surface to the fluid-outflow surface.

Figure 3:
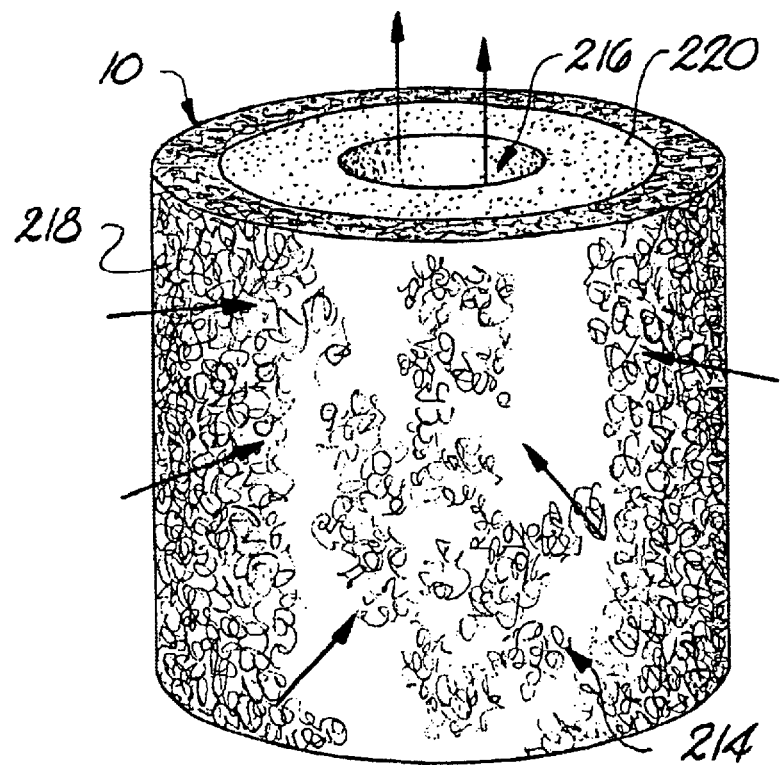
FIG. 3 is a diagrammatic representation of a cylindrical embodiment of the filter stages for the present invention (without a chamber).
Figure 4:
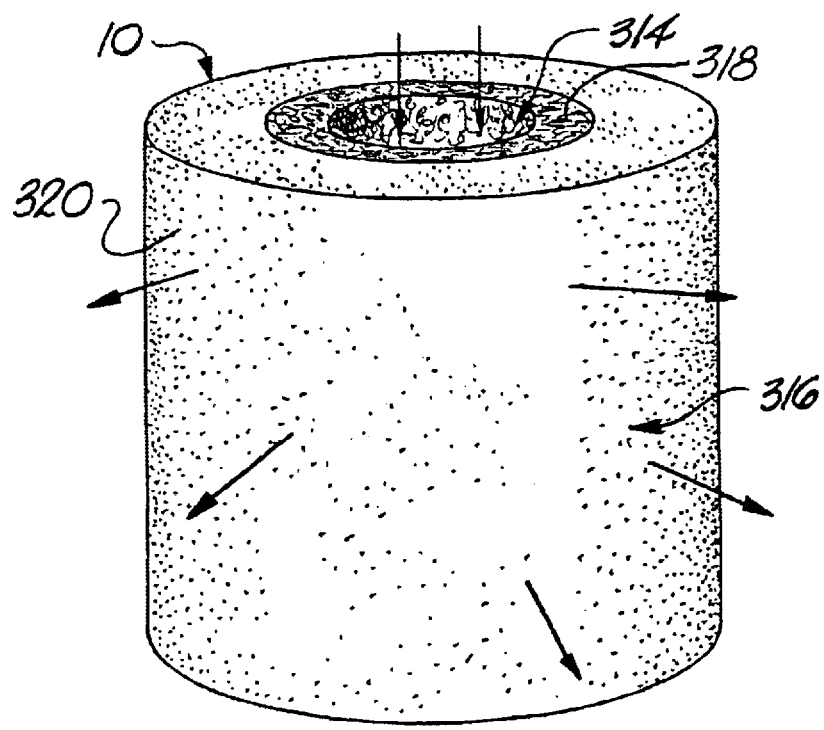
FIG. 4 is a diagrammatic representation of a cylindrical embodiment of the filter stages for the present invention (without a chamber).

A third embodiment of the present invention, shown with water flow moving radially inward, and then out of the cylinder in flow moving along the cylinder's hollow center axis. As depicted, the multistage water filter 210 includes an inlet 214 for water flow that is the outer face of the cylinder; an outlet 216 for water flow along the cylinders hollow center axis; a first filter stage 218 in fluid communication with inlet 214; and a second filter stage 220 in fluid communication with outlet 216. The second filter stage 220 is located at a position that allows water to pass through the first filter stage 218 prior to passing through the second filter stage 220. A chamber, not depicted in third embodiment, can readily be formed to accept this embodiment by one skilled in the art. As with the embodiments of FIG. 1 and FIG. 2, the first filter stage 218 includes a filter media that removes microorganisms such as a charge-modified meltblown or microfiber glass web. Similarly, the second filter stage 220 includes activated carbon. While not shown, a third filter stage can readily be added to the embodiment of FIG. 3 through the addition of a third, concentric layer of filter media. This third filter stage may be added as a concentric layer to the outside of first filter stage 218 or may be added as a concentric layer between first filter stage 218 and second filter stage 220.

A fourth embodiment with flow moving in a direction opposite to what is described in the third embodiment. Specifically, water in the fourth embodiment enters the device along the hollow center axis of the cylinder and then moves radially outward through the filter stages. The multistage water filter 310 of the fourth embodiment includes an inlet 314 for water flow along the cylinder's hollow center axis; an outlet 316 for water flow that is the face of the cylinder; a first filter stage 318 in fluid communication with inlet 314; and a second filter stage 320 in fluid communication with outlet 316. The second filter stage 320 is located at a position that allows water to pass through the first filter stage 318 prior to passing through the second filter stage 320. A chamber, not depicted in third embodiment, can readily be formed to accept this embodiment by one skilled in the art. As with the first three embodiments, the first filter stage 318 includes a filter media that removes microorganisms. Similarly, the second filter stage 320 includes activated carbon. While not shown, a third filter stage can readily be added to the fourth embodiments through the addition of a third, concentric layer of filter media. This third filter stage may be added as a concentric layer to the inside of first filter stage 318 or may be added as a concentric layer between first filter stage 318 and second filter stage 320.

Referring now to the second embodiment, to obtain filtered water, chamber 110 is connected within the path of water flow. Water passes through first filter stage 118 where microorganisms are removed from the water. Water then passes through third filter stage 122 where sediment and some organics are removed from the water. Flowing into the second filter stage 120, the activated carbon removes certain heavy metals, chlorine, and residual sediment from the water. Water then exits the second filter stage 120, passes through the outlet for water flow 116, out of chamber 110, and on to consumption or filtered water storage.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

What is claimed is:

1. A multistage process for filtering impurities from a liquid, said process comprising the steps of:
   supplying liquid to a filter;
   removing at least a portion of the microorganisms from said liquid supply in a first filtering step; and
   then removing at least a portion of the organics and other non-biological components in a second filtering step using activated carbon, further comprising a third filtering step that removes sediments and some organics prior in flow to said second filtering step, wherein said third filtering step is accomplished using a microfiber glass web and occurs before said first filtering step.

2. A multistage process for liquid filtration as recited in claim 1, wherein said filtering steps are conducted at the point of use for a water supply.

3. A multistage liquid filtration process as recited in claim 1 wherein said liquid is water.

4. A multistage liquid filtration process as recited in claim 1 wherein said first filtering step is accomplished using a charge-modified microfiber glass web.

* * * * *